(12) United States Patent
Oubichon

(10) Patent No.: US 7,373,962 B2
(45) Date of Patent: May 20, 2008

(54) MULTI-LAYER DRAW-STRING COOLER COVER

(76) Inventor: Raymond Anthony Oubichon, 1981 Dallas St., Aurora, CO (US) 80010

(*) Notice: Subject to any disclaimer, the term of this patent is extended or adjusted under 35 U.S.C. 154(b) by 176 days.

(21) Appl. No.: 11/118,152

(22) Filed: May 2, 2005

(65) Prior Publication Data
US 2006/0243730 A1 Nov. 2, 2006

(51) Int. Cl.
B65D 65/02 (2006.01)

(52) U.S. Cl. ............... 150/154; 150/165; 220/315; 261/DIG. 3; 261/DIG. 43

(58) Field of Classification Search ............. 150/154, 150/165; 261/DIG. 43, 24, DIG. 3; 220/315
See application file for complete search history.

(56) References Cited

U.S. PATENT DOCUMENTS

| | | | |
|---|---|---|---|
| 2,992,668 A * | 7/1961 | Collard | 150/165 |
| 3,938,694 A | 2/1976 | Archuleta | |
| 4,101,609 A | 7/1978 | Sumrow | |
| 4,122,561 A * | 10/1978 | Barr | 4/499 |
| 4,203,174 A * | 5/1980 | Schults | 4/502 |
| 4,262,373 A * | 4/1981 | Chambers | 4/502 |
| 4,498,912 A | 2/1985 | Wagner | |
| 4,625,784 A * | 12/1986 | Boroson | 150/165 |
| 4,732,012 A | 3/1988 | Thorpe | |
| 4,745,769 A * | 5/1988 | Wooden, Jr. | 62/259.1 |
| 4,972,529 A * | 11/1990 | Wolfson, Jr. | 4/500 |
| 5,148,646 A * | 9/1992 | Lutostanski | 52/66 |
| 5,307,849 A * | 5/1994 | Nelson | 150/165 |
| 5,664,975 A * | 9/1997 | Carlisle | 440/49 |
| 5,920,922 A * | 7/1999 | Ragsdale et al. | 4/502 |
| 5,984,172 A * | 11/1999 | Easterwood | 232/38 |
| 6,836,907 B1 * | 1/2005 | Pesta | 4/498 |

* cited by examiner

Primary Examiner—Sue A. Weaver
(74) Attorney, Agent, or Firm—Barber Legal; Craig Barber (57) ABSTRACT

An evaporative cooler cover having a three layer body internally dimensioned and configured to equal the external dimensions of at least one common model of evaporative cooler. A drawstring may provide a superior fit to the evaporative cooler device. The evaporative cooler cover may advantageously have a triple layer construction of a middle layer of nylon scrim or another loose fabric having two layers attached thereto: interior and exterior layers of solid vinyl or another polymer. The evaporative cooler cover of the invention may further be configured in either a generally cubical shape having an open bottom side or a generally cylindrical shape having an open bottom end.

4 Claims, 11 Drawing Sheets

MULTI-LAYER DRAW-STRING COOLER COVER

STATEMENT REGARDING FEDERALLY FUNDED RESEARCH

This invention was not made under contract with an agency of the U.S. Government, nor by any agency of the U.S. Government.

FIELD OF THE INVENTION

This invention relates generally to covers for evaporative coolers and specifically to evaporative cooler covers having improved cold crack features and improved ease of use.

CROSS-REFERENCE TO RELATED APPLICATIONS

N/A

BACKGROUND OF THE INVENTION

Evaporative coolers ("swamp coolers") are an extremely useful device for cooling in areas having low humidity. A fan blows ambient air across a wick, screen or other device for holding water on a large surface area. Evaporation of water cools the air flow substantially, without the heavy electrical requirements of an air conditioner compressor. The system obviously is tailored for low humidity parts of the country such as the mountain west, rather than for high humidity areas (where the degree of evaporation is constrained).

Residential evaporative coolers come in a number of standard types. In general, large roof mounted units have a down draft system in which a cool air supply duct exits the device from the bottom, passes through the roof of the domicile and then sends the cooled air into the home. Window units may be mounted on the window or may be mounted on the wall or ground beneath the window. A cool air supply duct exits one side of the system, passes through the window and then delivers the cool air to the home.

However, evaporative coolers have problems. First, the large area of screens or wicks inside the device can become dirty if left un-used for extended periods of time, such as a winter season. Second, since there is a water supply to the device and the cooler is necessarily mounted outside of the residence, during winter months the device must be kept warm or the water supply shut down. In addition, the large surface area of the unit (evaporative coolers are somewhat larger than air conditioners of equivalent capacity) may become dirty during long periods of disuse.

Thus, covering evaporative coolers during the "off season" is very important.

However, cooler covers known in the market suffer from a problem known as "cold crack". "Cold crack" is a technical term referring to that temperature at which the cover itself cracks due to cold. Obviously, being mounted in a potentially humid location (the outside of an evaporative cooler) exacerbates this problem. Worse, "cold crack" becomes worse with age of the cover: a cover which survives a given low temperature during the course of one winter may "cold crack" the very next winter at the exact same temperature, simply due to aging of the cover.

In addition to age and cold crack characteristics, the ease of use of a cooler cover is important: working on a roof or near a window on a large and bulky cooler is difficult enough without additional effort imposed by badly designed cooler covers. In one common system on the market, a cover has a hook-and-loop fabric strip (such as VELCRO (r) brand hook-and-loop fabric) running along one or two edges. A user of the device must physically run their hands along the edges having the fabric on order to secure it inch by inch, which may require reaching portions of a cooler which are up against walls, just above roof tiles, or in other inconvenient positions. One rationale for this is that it allows easier use of the device on evaporative coolers of different shapes and sizes under the reasoning that it may not always be commercially feasible to provide a cover for a single model of evaporative cooler.

However, evaporative coolers tend to come in a small number of shapes (generally cubical and generally cylindrical), and even in fairly standard sizes. For example, a given development or neighborhood may have one or a small number of prevalent evaporative coolers. The "standardized" covers on the market might then be a nuisance for a number of home owners who all find themselves winter after winter trying to figure out the best way to stretch, wrinkle or fold the cover so as to provide a tight fit. Needless folding or stretching, of course, then contribute to aging and cold crack.

The US Patent and Trademark Office collection of granted patents reveals teaching on evaporative cooler covers.

U.S. Pat. No. 4,732,012 issued Mar. 22, 1988 for ENERGY EFFICIENT EVAPORATIVE COOLER COVER APPARATUS teaches a hard-sided assembly used to shade the device in summer or block the vents in winter. It does not teach any construction of solid flexible polymer layers nor a drawstring. It argues away from making an evaporative cooler exactly fit an evaporative cooler by teaching that the device should be larger than the evaporative cooler with an overhand all around.

U.S. Pat. No. 4,498,912 issued Feb. 12, 1985 for SUNSCREEN COVER APPARATUS FOR AN EVAPORATIVE COOLER teaches a flexible evaporative cooler device which actually does have triple layer construction, however, it teaches a body allowing air flow through the sides for summer use: the layers are screens, not solid polymers. It also fails to teach drawstrings and exact sizing to the evaporative cooler.

U.S. Pat. No. 4,101,609 issued Jul. 18, 1978 for COVER HOLDER FOR EVAPORATIVE COOLER teaches yet another rigid cover lacking drawstrings and exact size matching to a given model of evaporative cooler.

U.S. Pat. No. 3,938,694 issued Feb. 17, 1976 teaches yet another rigid cover device lacking drawstrings and flexible coverings for easy installation.

It would be advantageous to provide a flexible evaporative cooler cover having internal dimensions dimensioned and configured to equal the external dimensions of a single model of evaporative cooler.

It would be advantageous to provide a flexible, impermeable, evaporative cooler cover having superior cold crack characteristics.

It would further be advantageous to provide an evaporative cooler cover having superior aging characteristics.

It would further be advantageous to provide an evaporative cooler cover having convenient structures for fastening the device to the evaporative cooler.

SUMMARY OF THE INVENTION

General Summary

The present invention teaches an evaporative cooler cover having a three layer body internally dimensioned and configured to equal the external dimensions of common models of evaporative coolers. A cover dimensioned and configured to the shape and size of one model of evaporative cooler may advantageously fit that one model and only that model and other models of identical shape and size. This greatly enhances ease of use when the cover is put on or taken off of the evaporative cooler, and obviously provides a tighter fit.

The present invention further teaches that a drawstring may provide a superior fit to the device, without requiring the user to engage hook-and-loop fabric all the way along one edge or side of the evaporative cooler.

The present invention further teaches that an evaporative cooler cover may advantageously have a triple layer construction of a middle layer of nylon scrim or another loose fabric having two layers attached thereto: interior and exterior layers of solid vinyl or another polymer.

The evaporative cooler cover of the invention may further be configured in either a generally cubical and flexible shape having an open bottom side or a flexible generally cylindrical shape having an open bottom end.

The evaporative cooler cover of the invention may further be constructed from low-cost products available on the market, in a low-labor process allowing quick construction.

Summary in Reference to Claims

It is a first aspect, advantage, objective and embodiment of the present invention to provide an evaporative cooler cover for a specific model of generally cubical evaporative cooler having a cool air supply duct projecting from one side thereof, the evaporative cooler cover comprising:
  a flexible impermeable body having five sides forming a hollow open-ended generally cubical shape in three dimensions of length, width and depth, the body having an interior length equal to the length of such evaporative cooler, the body having an interior width equal to the width of such evaporative cooler, the body having an interior depth equal to the depth of such evaporative cooler,
  the body having a first interior layer of flexible solid vinyl,
  the body having a second median layer of nylon woven scrim, and
  the body having a third external layer of flexible solid vinyl.

It is a second aspect, advantage, objective and embodiment of the present invention to provide an evaporative cooler cover further comprising:
  a rectangular hole in one side, the rectangular hole having a length and width equal to the length and width of such cool air supply duct.

It is a third aspect, advantage, objective and embodiment of the present invention to provide an evaporative cooler cover wherein the length of the rectangular hole is 22 inches, and further wherein the width of the rectangular hole is 11 inches.

It is another aspect, advantage, objective and embodiment of the present invention to provide an evaporative cooler cover further comprising:
  a drawstring positioned to encompass the open end of the body, the drawstring slidably attached to the body, the drawstring having a first slack position in which the open end of the body is not constrained by the drawstring, the drawstring having a second taut position in which it narrows the open end of the body.

It is yet another aspect, advantage, objective and embodiment of the present invention to provide an evaporative cooler cover wherein the slidable attachment of the drawstring to the open end of the body further comprises a fastener encompassing the open end.

It is another aspect, advantage, objective and embodiment of the present invention to provide an evaporative cooler cover wherein the body having an interior length equal to the length of such evaporative cooler is 28 inches, and further wherein the body having an interior width equal to the width of such evaporative cooler is 28 inches, and further wherein the body having an interior depth equal to the depth of such evaporative cooler is 40 inches.

It is yet another aspect, advantage, objective and embodiment of the present invention to provide a cylindrical evaporative cooler cover comprising:
  a flexible impermeable body having a hollow open-ended generally cylindrical shape in three dimensions, the body having an interior diameter equal to the length of such cylindrical evaporative cooler, the body having an interior depth equal to the depth of such evaporative cooler,
  the body having a first interior layer of solid vinyl,
  the body having a second median layer of nylon woven scrim, and
  the body having a third external layer of solid vinyl.

It is yet another aspect, advantage, objective and embodiment of the present invention to provide an evaporative cooler cover further comprising:
  a drawstring positioned to encompass the open end of the body, the drawstring slidably attached to the body, the drawstring having a first slack position in which the open end of the body is not constrained by the drawstring, the drawstring having a second taut position in which it narrows the open end of the body.

It is yet another aspect, advantage, objective and embodiment of the present invention to provide an evaporative cooler cover wherein the slidable attachment of the drawstring to the open end of the body further comprises a fastener encompassing the open end. 10.

INDEX TO REFERENCE NUMBERS

| | |
|---|---|
| Body | 100 |
| Top side | 102 |
| Left side | 104 |
| Front side | 106 |
| Cool air duct hole | 108 |
| Perimeter fastener | 110 |
| Drawstring hole | 112a, 112b |
| Drawstring | 114a, 114b |
| Interior | 120 |
| Back side | 122 |
| Right side | 124 |
| Body | 200 |
| Top side | 202 |
| Side | 204 |
| Side, rear view | 204b |
| Perimeter fastener | 210 |
| Drawstring hole | 212a, 212b |
| Drawstring | 214a, 214b |
| Interior | 220 |
| Interior layer | 302 |
| Middle layer | 304 |
| Outer layer | 306 |

DETAILED DESCRIPTION

Figure 1:
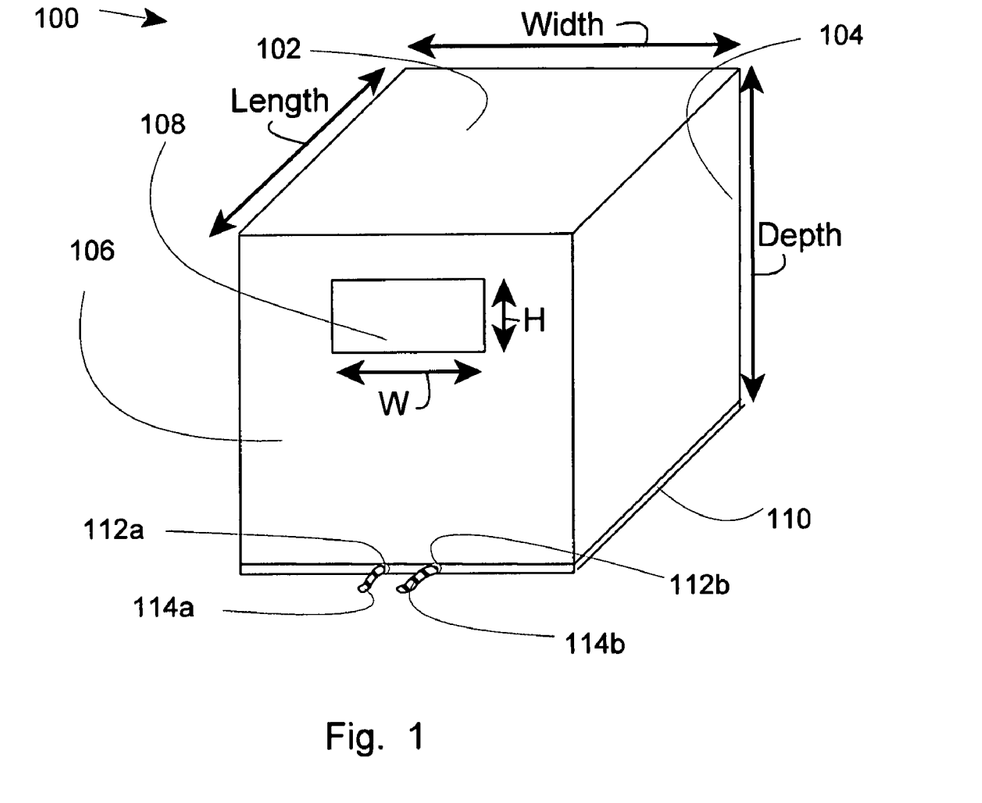
FIG. 1 is a front elevational perspective view of a first embodiment of the invention.
Figure 2:
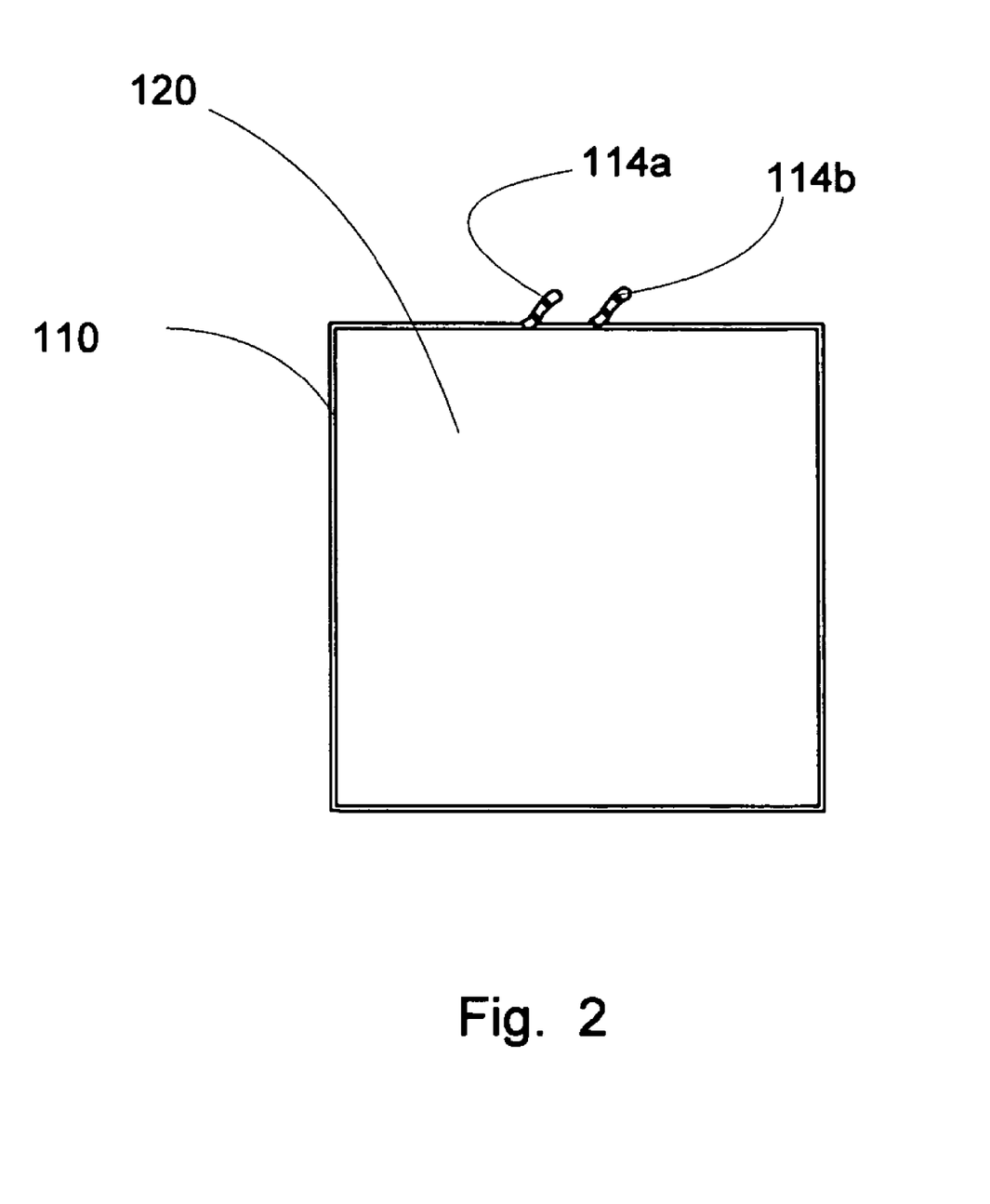
FIG. 2 is a bottom plan view of the first embodiment of the invention.

FIG. 1 is a front elevational perspective view of a first embodiment of the invention, while FIG. 2 is a bottom plan view of the first embodiment of the invention. Body 100 is a substantially hollow and flexible body in a generally prism or cube shape: a three dimensional rectangle.

Top side 102, left side 104, front side 106, back side 122 and right side 124 are the five sides used in the generally right angled embodiments of the device. Each side is attached at the edges to those sides geometrically adjoining it.

Cool air duct hole 108 allows a cool air duct to project through the evaporative cooler cover. While the evaporative cooler cannot be used when covered, the evaporative cooler cover provides a tighter fit if the duct is allowed to project, and installation and removal of the cover is easier with this. The cool air duct hole 108 may be rectangular and may have a length and width equal to the length and width of an evaporative cooler cool air duct at the point it leaves the main body of the evaporative cooler.

Perimeter fastener 110 may in the preferred embodiment be a channel passing around the entire perimeter of the open end of the evaporative cooler. In the presently preferred embodiment and best mode now contemplated, a channel may be provided by doubling over a short section of the sides, folded to make an internal channel. In other embodiments, perimeter fastener 110 may be a series of loops, may be a channel within the three layers of the body, may be a series of grommets or may be any other device or structure which allows a drawstring to be slidably attached to the body 100. Drawstring holes 112a, 112b allow drawstring 114a, 114b to protrude out from the fastener 110 and thus be accessible to the user.

In use, the drawstring has at least two positions: a tight or taut position in which the drawstring is pulled and secured so as to at least slightly narrow the open end of the body, and a loose or open position in which the open end may reach its normal full size. This advantage of the present invention allows much easier use during installation and removal.

Interior 120 is accessible through the open end shown in FIG. 2. The dimensions of interior 120 are important to the invention. In addition to other improvements, it is one aspect and advantage of the invention to provide an interior space having dimensions which match the dimensions of certain models of evaporative coolers. In practice, the inventor has noted that evaporative coolers tend to "cluster" with similar models of evaporative coolers. For example, after natural disaster leaves a certain neighborhood with large numbers of insurance claims for home repair, numerous individuals may decide to purchase similar models of evaporative coolers at the same time. As another example, a developer may elect to provide evaporative coolers in new homes, and the developer almost always chooses a very small number of models for the homes of the sub-division. Thus contrary to common sense and contrary to known evaporative cooler covers, it is possible to commercially provide a close or even exact fit to a single model of evaporative cooler.

For purposes of the present invention, dimensions of an evaporative cooler cover are "equal" to the dimensions of the evaporative cooler if they fall within a span of one inch either larger in size or smaller. Dimensions of an evaporative cooler are "exactly equal" if they are within a span of one quarter inch in size, larger or smaller.

One example embodiment of the device is presented in Table I. The device having these dimensions provides an excellent fit to a certain model of evaporative cooler.

TABLE I

| Length | Width | Depth | Opening Width | Opening Height |
|---|---|---|---|---|
| 28 inches | 28 inches | 40 inches | 22 inches | 11 inches |

By this means, the body of the evaporative cooler, normally a three dimensional box shape (a prism or three dimensional rectangle or cube), may be covered on all sides except the bottom. The flexible impermeable body of the invention blocks flow of cold winter air into the home ducts via the evaporative cooler and prevents accumulation of dust and dirt on the various surfaces on and in the evaporative cooler.

Figure 11:
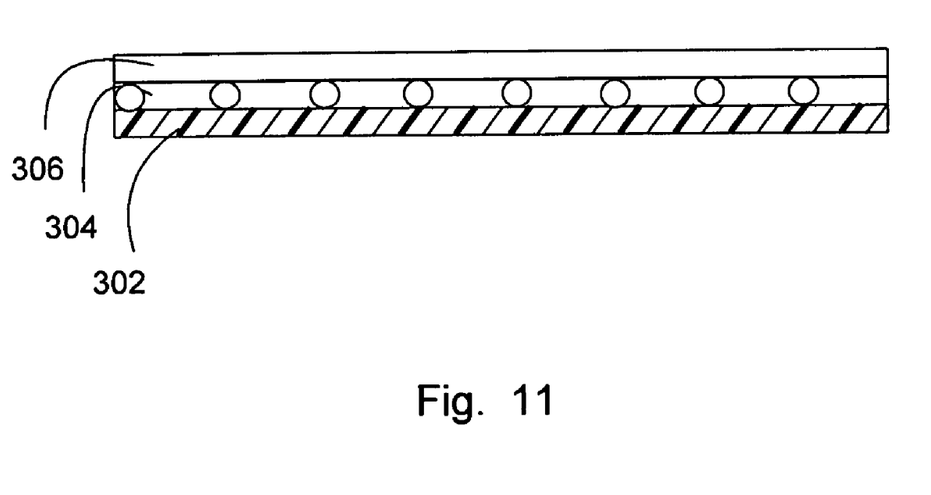
FIG. 11 is a cross sectional view of a third embodiment of the invention.

The internal structure of the body of the invention is another important advantage of the present invention: the layered structure is discussed further in reference to FIG. 11.

Figure 3:
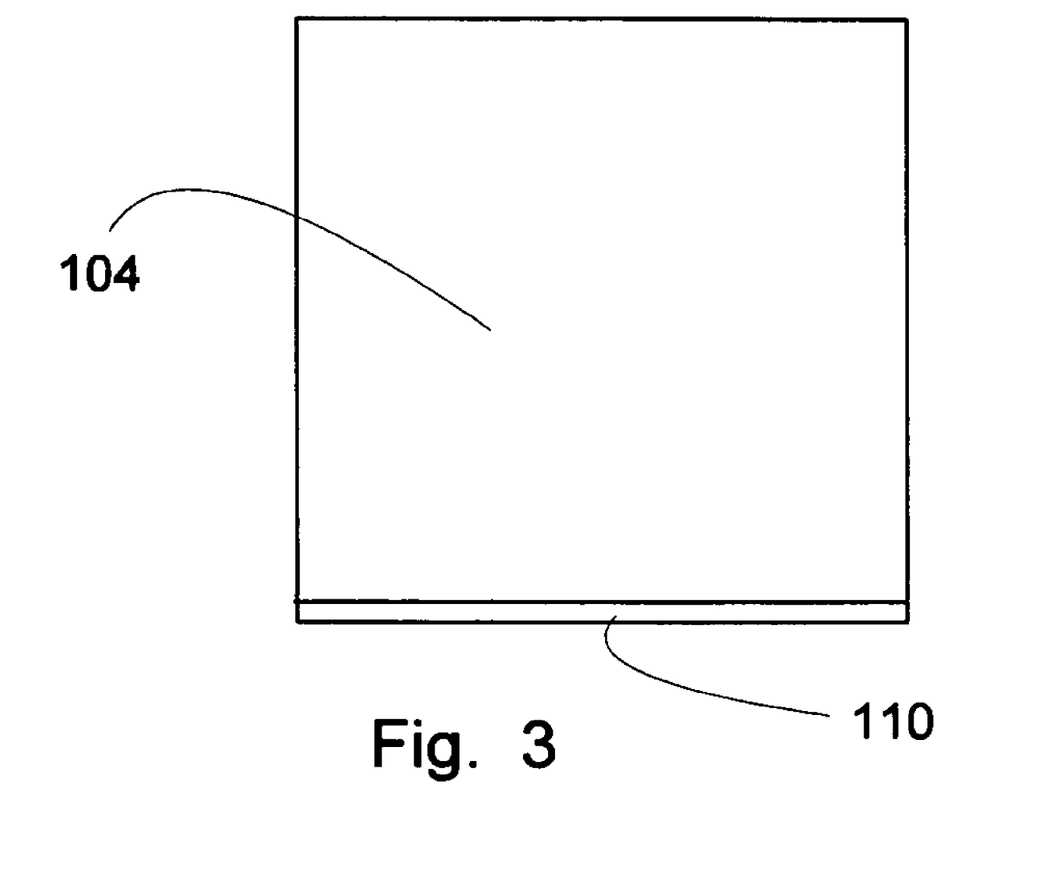
FIG. 3 is a left side view of the first embodiment of the invention.
Figure 4:
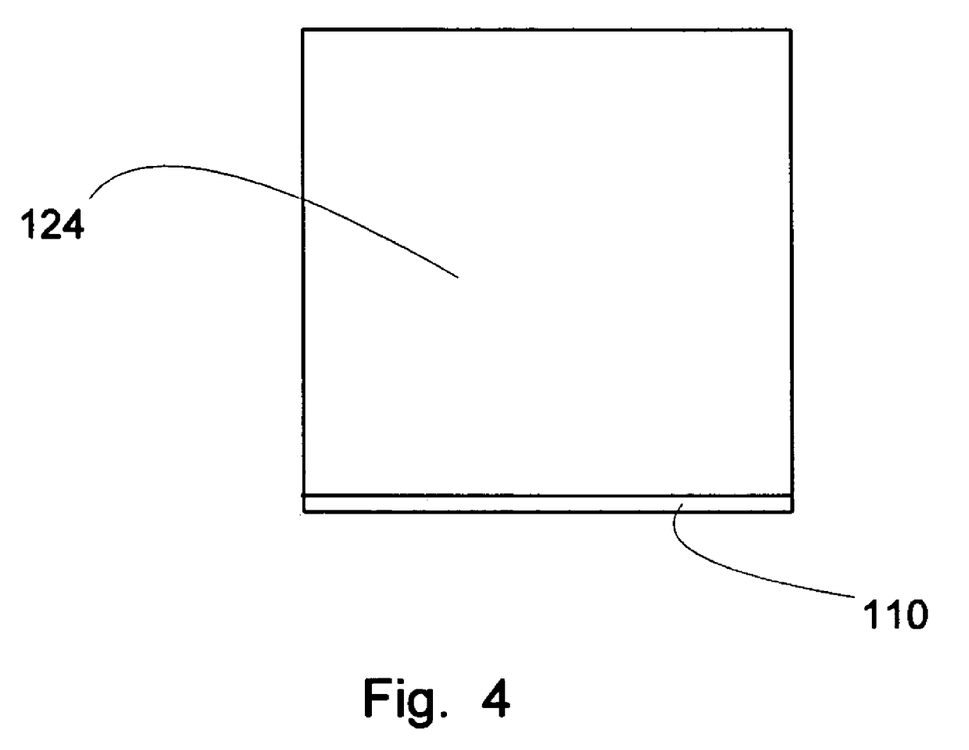
FIG. 4 is rear view of the first embodiment of the invention.
Figure 5:
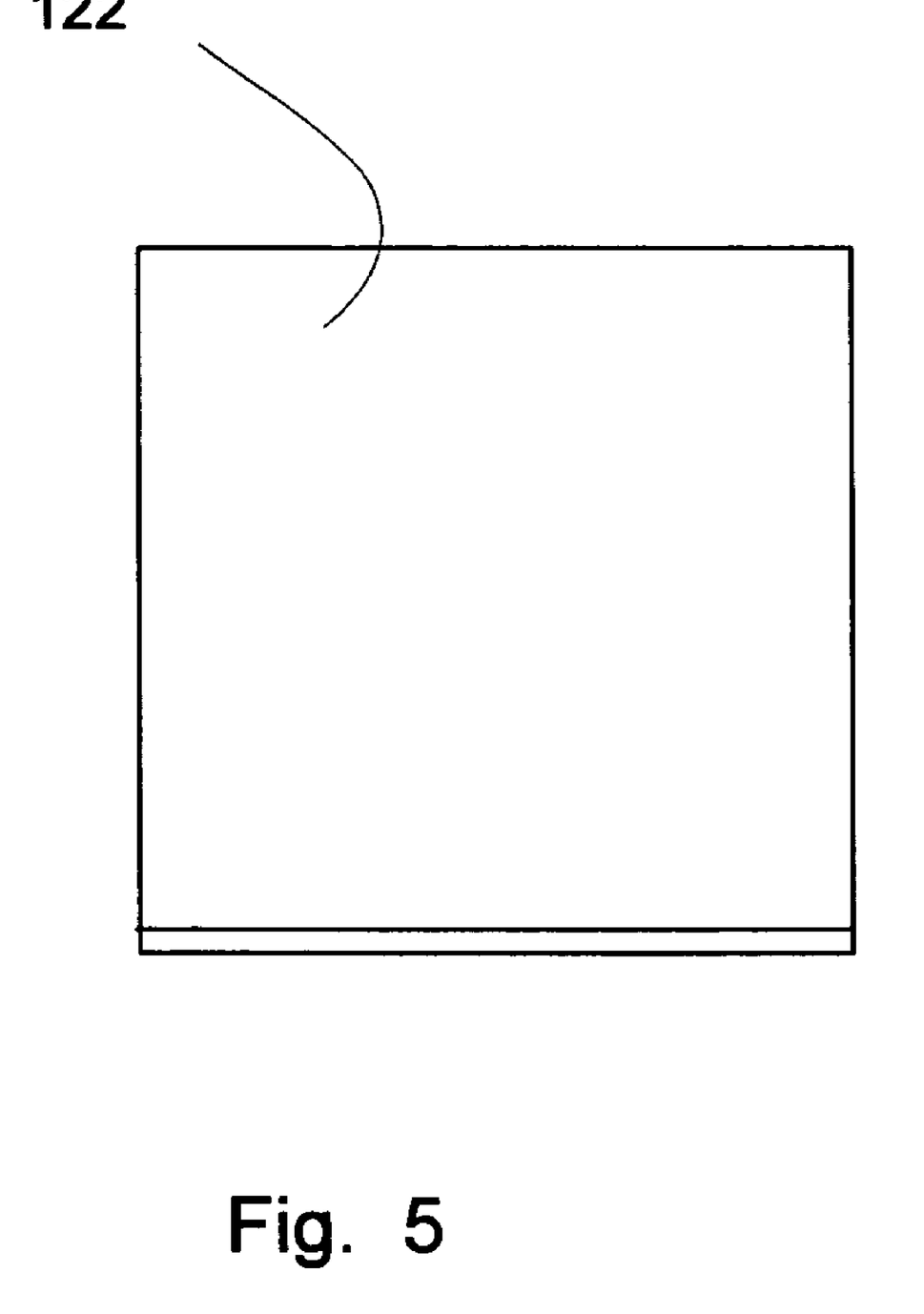
FIG. 5 is a right side view of the first embodiment of the invention.
Figure 6:
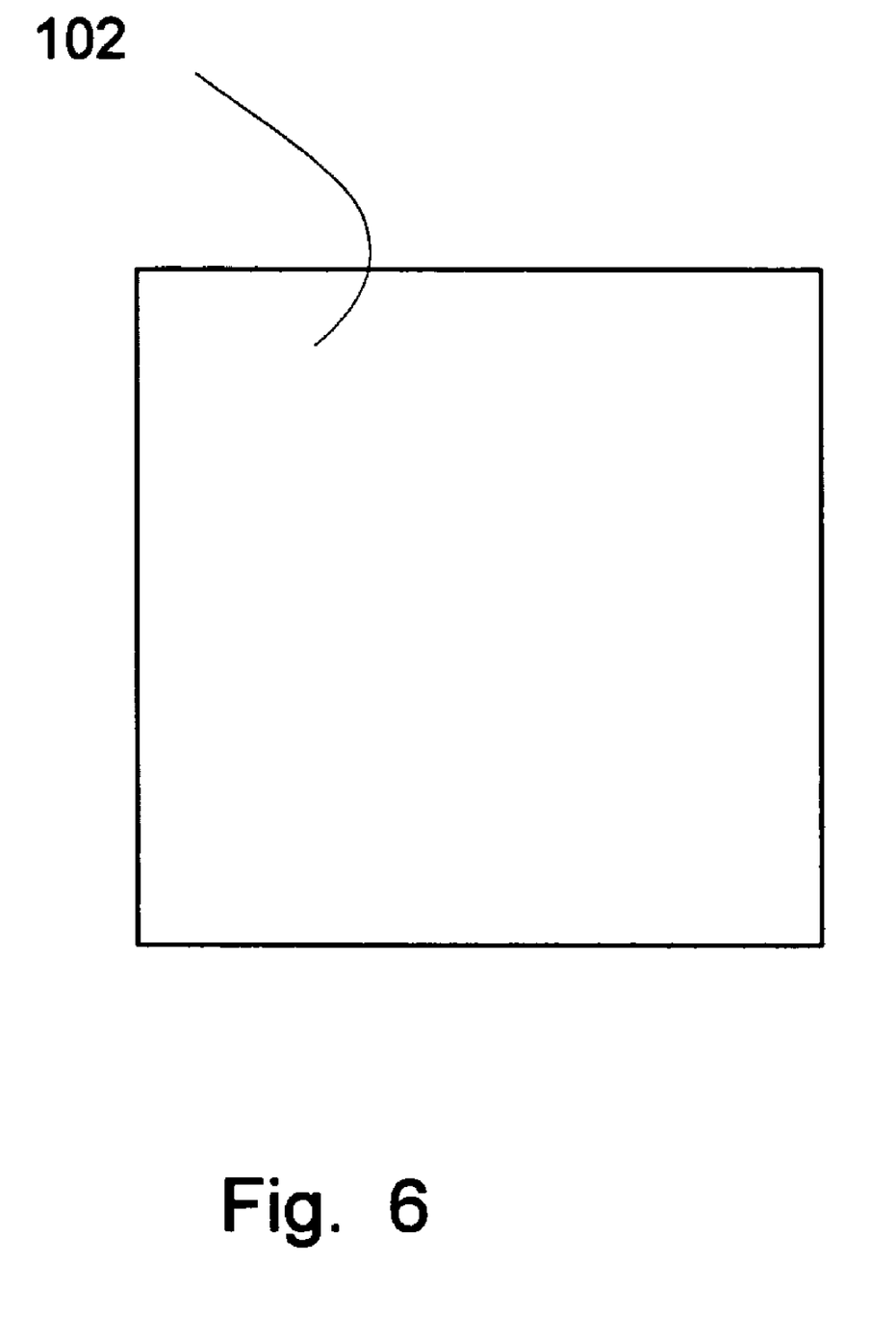
FIG. 6 is a top plan view of the first embodiment of the invention.

FIG. 3 is a left side view of the first embodiment of the invention, FIG. 4 is rear view of the first embodiment of the invention and FIG. 5 is a right side view of the first embodiment of the invention. In the sub-embodiment depicted, the five sides of the invention are substantially similar rectangles. However, FIG. 6 is a top plan view of the first embodiment of the invention, which differs in not having any portion of the perimeter fastener 110.

Figure 7:
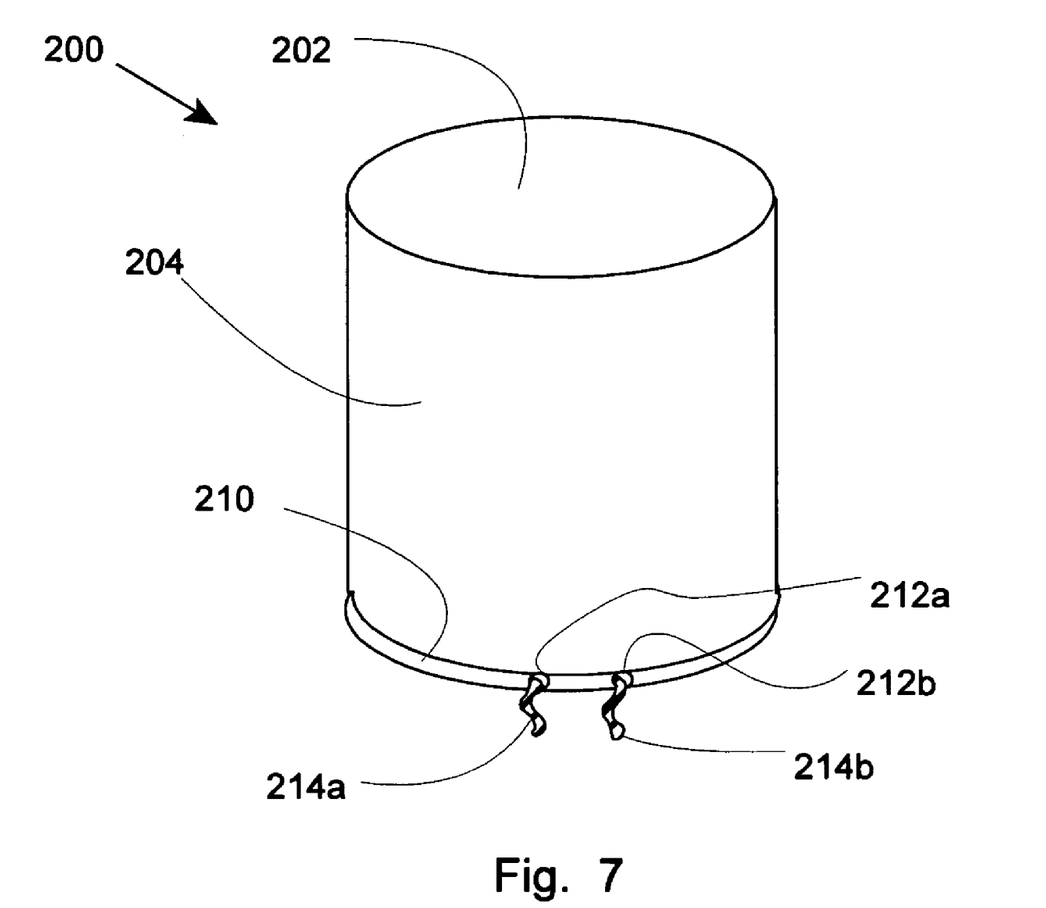
FIG. 7 is a front elevational perspective view of a second embodiment of the invention.
Figure 8:
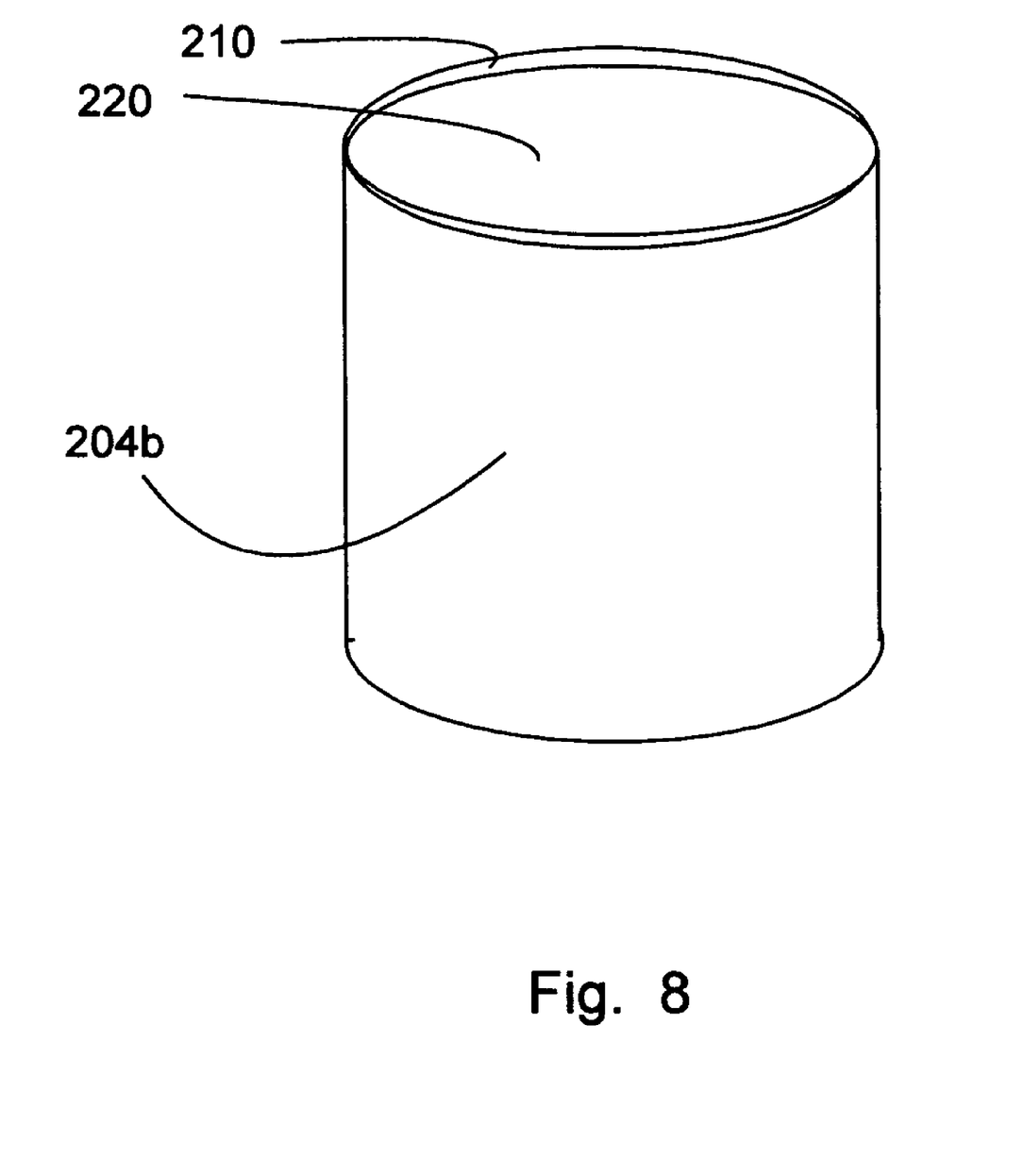
FIG. 8 is a side declivational perspective view of the second embodiment of the invention.

Numerous different models of evaporative cooler covers may be constructed to equal the dimensions of numerous different evaporative cooler FIG. 7 is a front elevational perspective view of a second embodiment of the invention, while FIG. 8 is a side declivational perspective view of the second embodiment of the invention, showing portions of the bottom side and interior.

Body 200 is substantially cylindrical, which is a presently preferred embodiment and best mode now contemplated for the shape of the invention. Top side 202 may be substantially circular, elliptical or oval, while side 204 is cylindrical having a cross section matching the plan shape of top side 202. Side in rear view 204b is the same side (which may be identical all the way around) shown from a declivational view (a view from lower down) showing the bottom of the evaporative cooler cover.

Perimeter fastener 210 may be as discussed in reference to the first embodiment. Drawstring holes 212a, 212b allow drawstring ends 214a, 214b to protrude out of the fastener, all of which may be as discussed in reference to the first embodiment. However, it will be noted that the open end is circular, oval, or elliptical, matching top side 202.

Interior 220 is accessible through the open end shown in FIG. 8. The dimensions of interior 120 are important to the invention: as discussed in reference to FIG. 2, dimensions equal or exactly equal to the dimensions of a model of evaporative cooler allow easier use and better protection of the evaporative cooler during the off season.

Table Two shows one example of dimensions which have proven to fit well on a certain model of evaporative cooler.

TABLE TWO

| Diameter | Depth |
| --- | --- |
| 41.5 inches | 38 inches |

Figure 9:
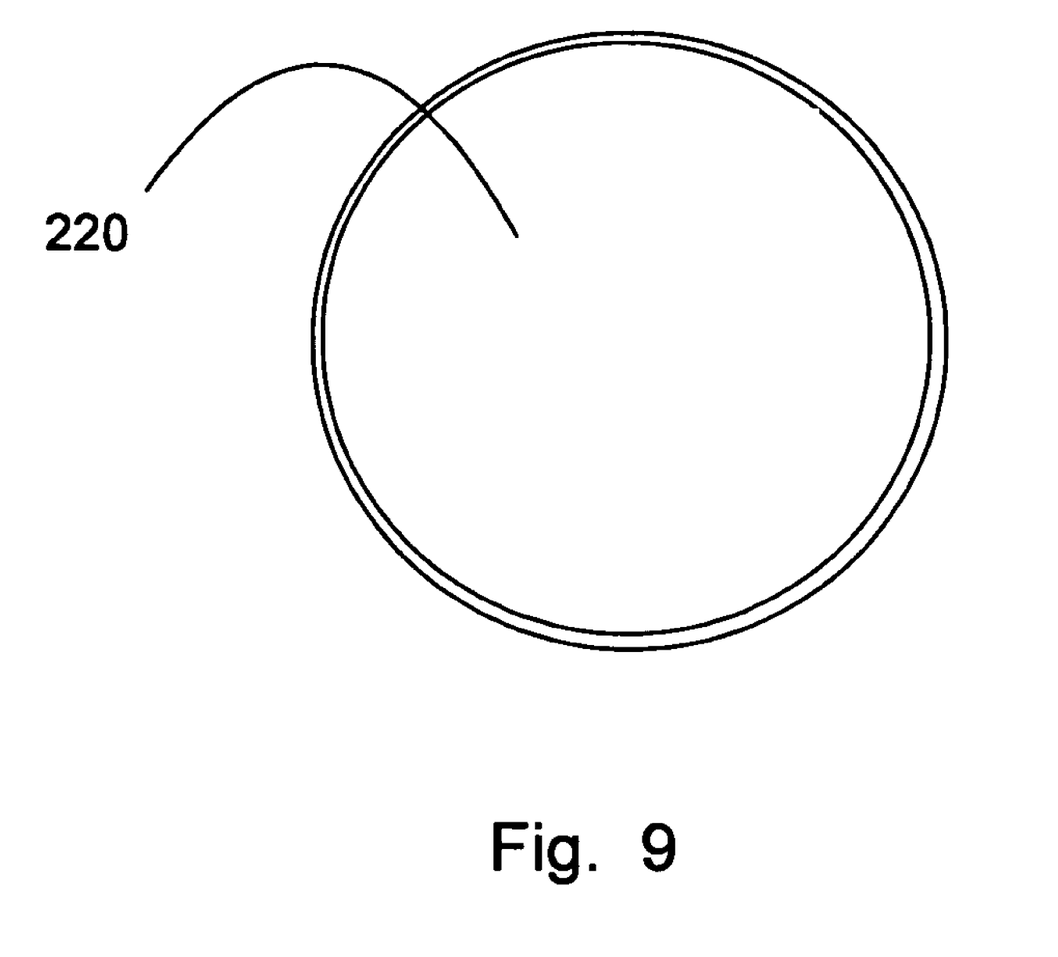
FIG. 9 is a bottom plan view of the second embodiment of the invention.
Figure 10:
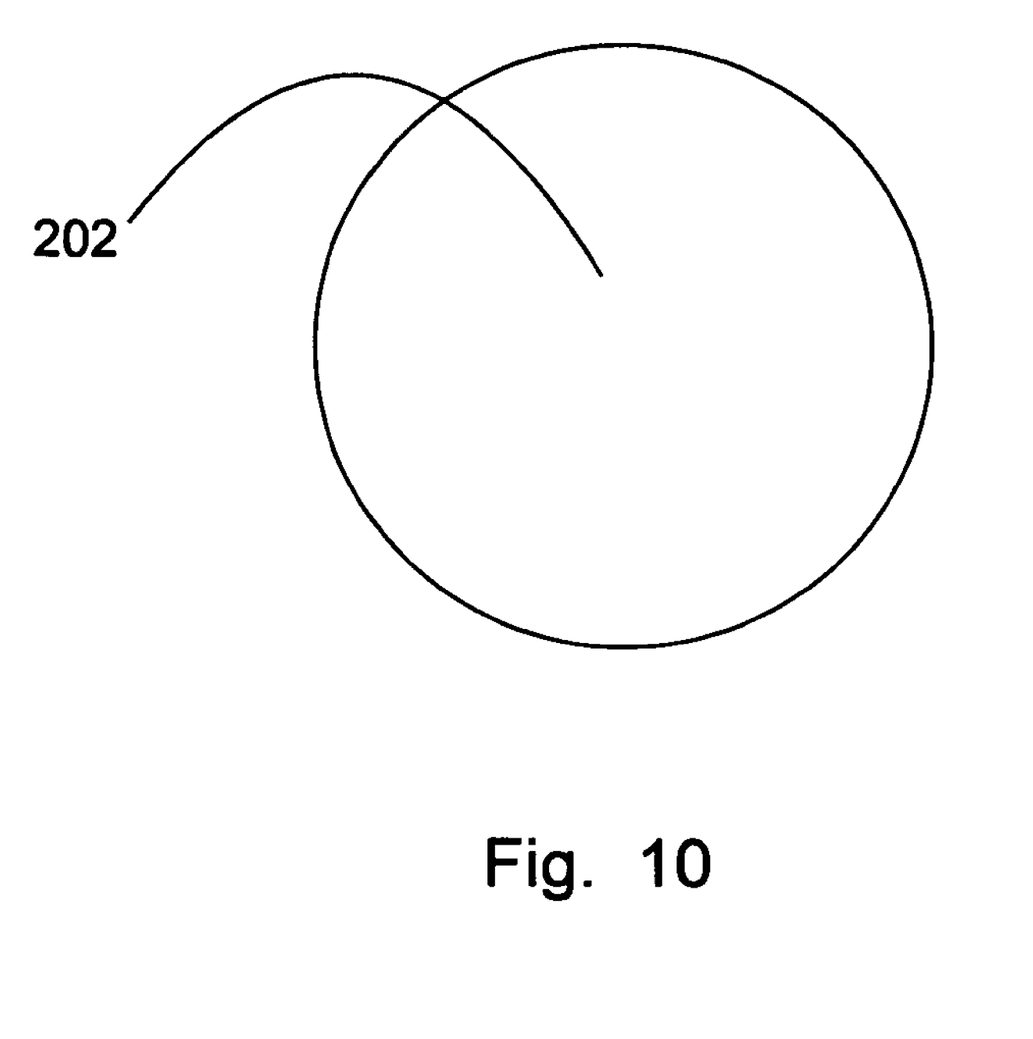
FIG. 10 is top plan view of the second embodiment of the invention.

FIG. 9 is a bottom plan view of the second embodiment of the invention, FIG. 10 is top plan view of the second embodiment of the invention. As noted, the shape may be perfectly circular as in one presently preferred embodiment, or it may be oval, ellipse shaped, etc.

FIG. 11 is a cross sectional view of a third embodiment of the invention. There are excellent properties of the triple layers of the construction and it is also a combination of structures which has a low cost and easy availability on the market. Interior layer 302 may be a solid vinyl or other polymer, while middle layer 304 may advantageously be a nylon scrim, though scrims of other materials including polymers, natural fabrics, metal weaves and other materials may be used as well. A scrim may be any light fabric woven in an open mesh, or any fabric adhered to another material to prevent shrinkage, warping or similar problems. Exterior layer 306 may be a solid vinyl or other polymer. The "interior" layer refers to the layer adjacent the interior space of the body, the "exterior" layer is that layer on the outside of the body. The middle layer is the layer sandwiched in between the interior and exterior layers. Without wishing to be bound by any theory, it is believed that the strength of the triple layer structure is provided by the scrim insert. The crucial properties of age resistance, mildew resistance and especially cold crack are believed to be satisfactorily met by the interior and external layers: again without wishing to be bound by any theory, it is believed that the solid vinyl protects itself by not flexing in tight corners but rather by flexing in small radius curves.

Tests of installation and removal, carried out by the inventor, show that the device is commercially practicable due to ease of the installation and removal. Longitudinal testing of the invention by the inventor has revealed that cold crack properties of the evaporative cooler cover of the invention, when made with a triple layer structure, are excellent. Testing of the layers of the structure by manufacturers of the layers shows the construction to have high tensile strength, cold crack and mildew resistance properties. According to makers, the cold crack rating under Federal Standard 191-5874 is -58 degrees Fahrenheit.

The body of the invention remains impermeable to air by use of the triple layer construction, and also remains flexible to allow installation and removal on a yearly cycle. Note that the term "impermeable" as used herein does not mean complete blocking of all air passage: while the various sides of the body are impermeable in that sense, some slight air flow may occur through the open end or at stitching where the sides are joined within the meaning of the word impermeable as used herein. This is in contrast to prior art devices such as the '912 patent cited in the BACKGROUND, which argues toward use of screens which facilitate air flow and away from impermeable covers, or the '012 patent which is also designed to facilitate air flow.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. An evaporative cooler cover for a specific model of generally cubical evaporative cooler having a cool air supply duct projecting from one side thereof, the evaporative cooler cover comprising:

a flexible impermeable body having five sides forming a hollow open-ended generally cubical shape in three dimensions of length, width and depth, the body having an interior length equal to the length of such evaporative cooler, the body having an interior width equal to the width of such evaporative cooler, the body having an interior depth equal to the depth of such evaporative cooler, a rectangular hole in one side, the rectangular hole having a length and width equal to the length and width of such cool air supply duct, the length of the rectangular hole 22 inches and the width of the rectangular hole 11 inches, the body having a first interior layer of flexible solid vinyl, the body having a second median layer of nylon woven scrim, and the body having a third external layer of flexible solid vinyl.

2. The evaporative cooler cover of claim 1, further comprising:

a drawstring positioned to encompass the open end of the body, the drawstring slidably attached to the body, the drawstring having a first slack position in which the open end of the body is not constrained by the drawstring, the drawstring having a second taut position in which it narrows the open end of the body.

3. The evaporative cooler cover of claim 2, wherein the slidable attachment of the drawstring to the open end of the body further comprises a fastener encompassing the open end.

4. The evaporative cooler cover of claim 1, wherein the body having an interior length equal to the length of such evaporative cooler is 28 inches, and further wherein the body having an interior width equal to the width of such evaporative cooler is 28 inches, and further wherein the body having an interior depth equal to the depth of such evaporative cooler is 40 inches.

\* \* \* \* \*